United States Patent [19]

Arvidsson

[11] Patent Number: 5,202,937
[45] Date of Patent: Apr. 13, 1993

[54] ARRANGEMENT FOR AN AXIAL AND RADIAL BEARING UNIT

[75] Inventor: Thomas Arvidsson, Linkoping, Sweden

[73] Assignee: Hymac Ltd., Canada

[21] Appl. No.: 859,003

[22] Filed: Mar. 27, 1992

[51] Int. Cl.$^5$ .............................................. F16C 19/52
[52] U.S. Cl. ..................................... 384/101; 384/563
[58] Field of Search ............... 384/101, 563, 102, 121, 384/517, 111

[56] References Cited

FOREIGN PATENT DOCUMENTS 0321143  2/1970  Sweden .
1421751  1/1976  United Kingdom .
86-01434 3/1986  World Int. Prop. O. .

Primary Examiner—Lenard A. Footland

[57] ABSTRACT

The present invention relates to an axial hydrostatic thrust-bearing for an axial and radial bearing unit. This consists of two hydrostatic axial bearings (12, 13) acting on either side of a pressure plate or flange (14) which is connected to the shaft (6). The hydrostatic bearings, each of which is equipped with at least one fluid pocket supplied with fluid from an external flow source, exhibit an external form such that, in combination with the bearing housing, they form the hydraulic pressure chambers C and D. These pressure chambers in turn are in direct contact with the pressure chambers A and B of the of the linear servo motor, which in turn are formed by the frame (1), the bearing housing (2) and a back plate (3). The pressure inside the chambers A and B is regulated via a servo valve (8) in proportion to the externally applied axial loading. In this way the hydrostatic bearings (12, 13) are capable, proportionally to the externally applied axial loading, of absorbing either the whole or parts of same irrespective of its magnitude or direction.

3 Claims, 2 Drawing Sheets

ARRANGEMENT FOR AN AXIAL AND RADIAL BEARING UNIT

The present invention relates to an arrangement for an axial and radial bearing unit comprising two halves, each consisting of an outer ring, an inner ring and, where appropriate, sliding or rolling devices arranged between them, whereby two hydrostatic bearings acting axially in mutually opposing directions, each having at least one fluid pocket supplied with a fluid from a flow source, are applied against one or two flanges connected to the shaft.

The invention is intended to be used in grinding equipment, such as refiners and pulping mills, preferably for cellulose-based materials. This application is described below, in conjunction with which it should be pointed out that the invention is in no way restricted to machines of this type.

One common type of disc crusher consists of two discs capable of rotating relative to one another, of which at least one is mounted on a rotating shaft. The two discs are in contact with one another, and any "grinding force" resulting from the grinding operation will force them apart. This force must be counteracted, of course, in order for the grinding work to continue, and in the case of the rotating disc/discs this means that an adequate axial bearing is required for the shaft.

One familiar type of bearing which is often used in equipment of this sort is the combined axial and radial bearing of the spherical model. As its name implies, this bearing has the ability to absorb both a radial and an axial loading, although some type of axial loading is required in order to achieve the play free function which is essential for the grinding operation.

This problem can be solved in the case described here with two such bearings interacting with one another by the application of an axial pre-loading force between the outer rings of the two bearings, in this way forcing them apart. The axial force in question can be produced in accordance with a previously disclosed method by means of one or more spring units.

In certain cases, however, this type of bearing exhibits limitations in its ability to absorb axial loadings which are of significance to its intended use. In order to be able to cope with the high axial loadings which can arise in this type of equipment, in some instances approaching 100 tons, some sort of "extra" axial bearing is needed. Types of bearing which possess the capacity to absorb very high axial loadings are the so-called hydrostatic bearings, for example.

These work under conditions of so-called full-film lubrication, in which metal-to-metal contact between the bearing surfaces is totally absent, hence the considerable bearing capacity. The oil film in question is achieved via an externally applied pressure source (e.g. an oil pump).

If a bearing of this kind can be utilized as a so-called thrust-bearing and can be actuated by hydraulic means proportionally to the externally applied axial load in such a way as to absorb it in whole or in part, then it is possible to cope with essentially very much higher grinding forces.

Description of the invention and its preferred embodiments

One accepted method for controlling the so-called grinding gap, i.e. the distance between the discs of the equipment, is the actuation of a linear hydraulic motor by hydraulic means with the help of a servo valve. The hydraulic motor consists of two pressure chambers acting against one another, such that the quantity of fluid and the pressure in each of them can be actuated directly with the help of the aforementioned servo valve.

Figure 1:
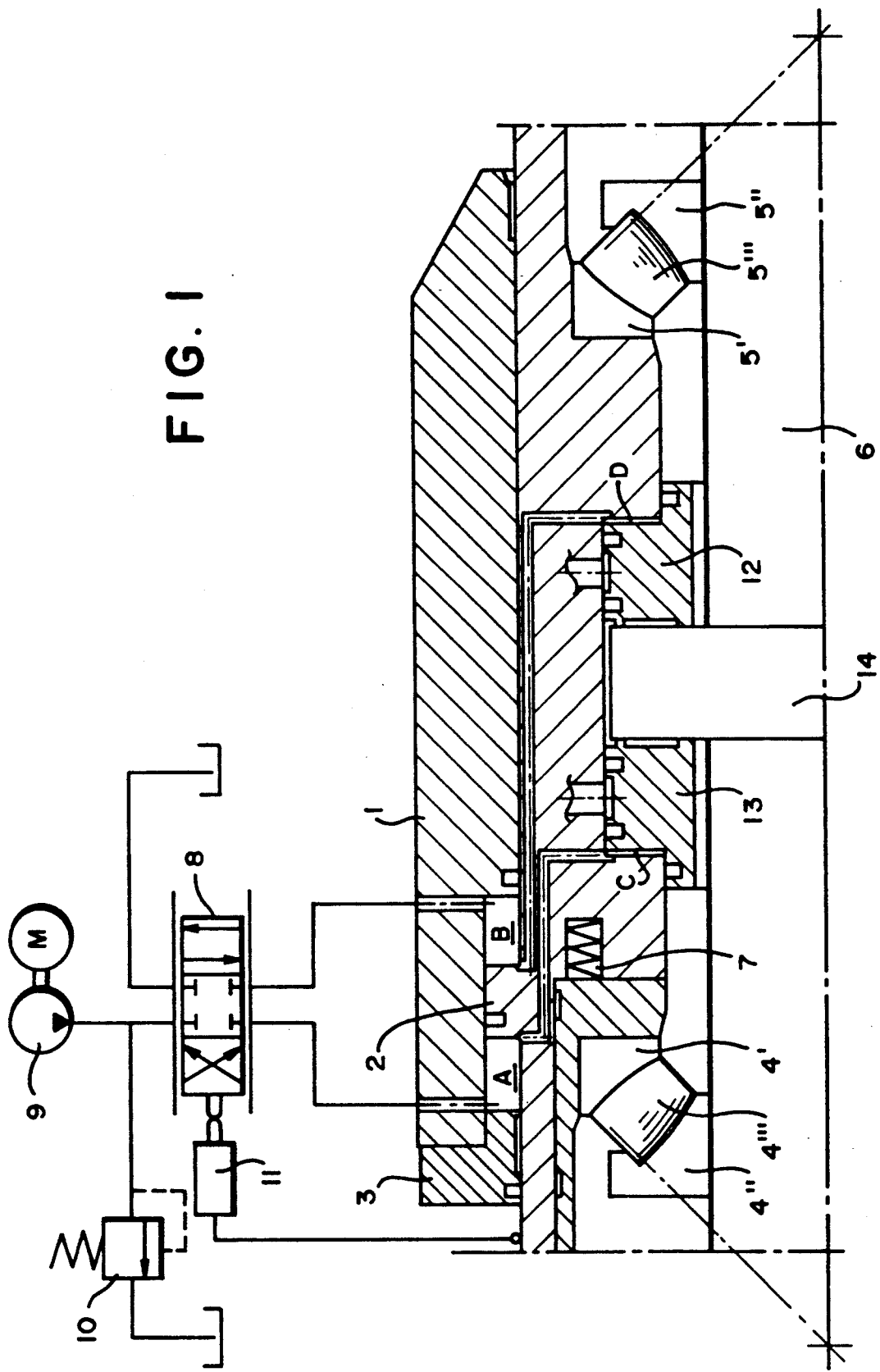
FIG. 1 shows an axial and radial bearing equipped with the invention, as a sectioned view from the centreline of the shaft upwards.

The designation 1 is used in FIG. 1 for the frame of the grinding equipment, 2 for its bearing housing and 3 for a back plate. 1, 2 and 3 together with the seals form the aforementioned hydraulic motor with its two pressure chambers A, B. The two combined axial and radial bearings 4, 5 are situated inside the bearing housing on the main shaft 6. In order for the bearings 4, 5 to assume a radially and axially play-free condition, their two outer rings 4', 5' are pre-loaded in relation to one another by means of a number of springs 7.

The two pressure chambers A, B are connected to a hydraulic control valve which, in order to be capable of providing the stepless regulation of the linear servo motor, must exhibit the characteristic of being able to regulate both the pressure and the quantity of the fluid in the aforementioned pressure chamber. The reason for this is that the grinding force generated between the discs must be free to vary without significantly changing the grinding gap, which is capable of adjustment during operation.

One arrangement with these characteristics is a hydraulic servo valve of standard type 8, which is supplied with a constant system pressure from a hydraulic pump 9 via a constant pressure valve 10. This valve distributes one half of its generated system pressure to each chamber A, B when in axial equilibrium, i.e. with the slide of the valve in its central position. By displacing the valve slide in one direction or the other, this will cause the outgoing pressure to be increased or reduced in proportion to the magnitude of the displacement.

If the slide of the servo valve is reconnected to the servo motor (the bearing housing), either mechanically or electrically, the result is that the slightest displacement of the main shaft 6 will produce a corresponding increase/ reduction in the pressure in the respective chamber.

A corresponding permanent displacement of the servo motor can be achieved by presetting the central position of the valve slide by external actuation. This will then occur by the valve permitting a larger/smaller quantity of fluid to pass into the respective chamber. This function is achieved in practice by means of a stepping motor 11 or an adjuster screw.

Since the pressure chambers A, B in this case have equally large pressure-exposing areas, the above argumentation means that the pressure difference between A and B will always be directly proportional to the externally applied axial loading on the bearing unit.

In order to be able to use the thrust-bearing 12, 13 positioned between the bearings 4, 5, the main shaft has been equipped with a flange or pressure plate 14. Their external form, in combination with the bearing housing 2 and the seals, means that the hydrostatic axial bearings form the hydraulic pressure chambers C, D.

As will be appreciated from FIG. 1, A and B are in direct contact with C and D, as a consequence of which, given that the areas which are exposed to pressure in A, B, C and D are of identical size, the grinding force applied to the main shaft will be balanced by an equally large force exerted by the hydrostatic bearings.

The result of this, which the patent application has attempted to describe, is a hydrostatic thrust-bearing which exhibits the capacity, proportionally to the externally applied axial loading, of absorbing either the whole or parts of same irrespective of its magnitude or direction. This means, as described in the example above, that the two pre-loaded axial and radial bearings can remain unaffected irrespective of the axial loading.

Figure 2:
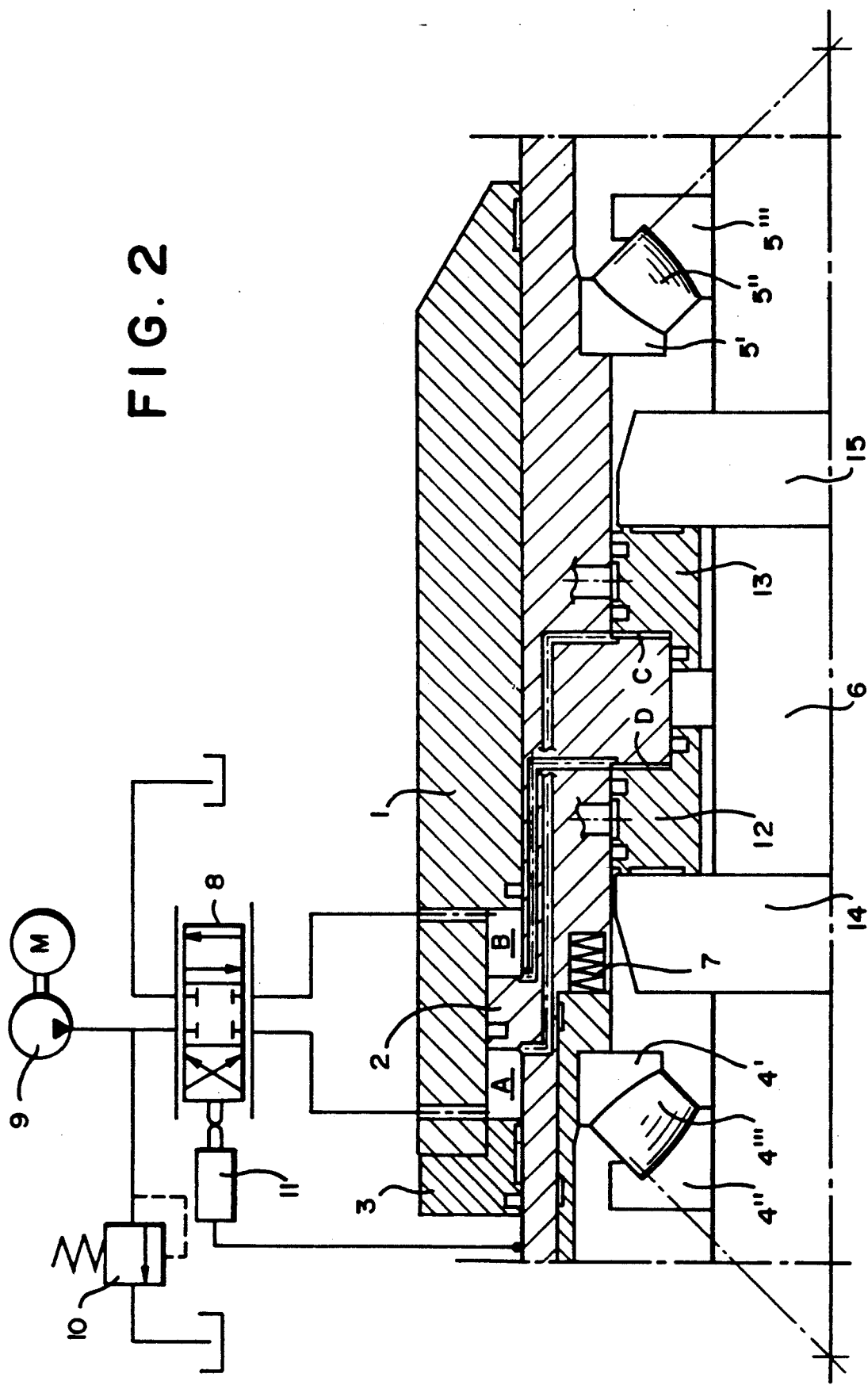
FIG. 2 shows a possible variant of FIG. 1 within the scope of the invention.

FIG. 2 describes a thrust-bearing which is in principle equivalent in its function, but with the difference that the hydrostatic bearings now face away from one another and act each against its own flange, instead of acting each against the same flange as in FIG. 1.

I claim:

1. Arrangement for an axial and radial bearing unit comprising two halves (4, 5), each consisting of an outer ring (4', 5'), an inner ring (4", 5") and, where appropriate, sliding or rolling devices (4''', 5''') arranged between them, whereby two hydrostatic bearings (12, 13) acting axially in mutually opposing directions, each having at least one fluid pocket supplied with a fluid from a flow source (9), are applied against one or two flanges (14, 15) connected to the shaft, characterized in that the hydrostatic bearings are so arranged, via their individual pressure chamber (C, D), as to absorb a loading which lies in a predetermined relationship to the external loading applied to the axial and radial bearing unit.

2. Arrangement according to Patent claim 1 consisting of a linear hydraulic motor so arranged as to displace the axial and radial bearing unit axially in order to adopt a predetermined axial position, characterized in that the linear hydraulic motor is operatively connected to the pressure chambers C and D.

3. Arrangement according to Patent claim 2, characterized in that the hydraulic motor consists of two pressure chambers acting upon the axial and radial bearing unit in opposing axial directions, which pressure chambers communicate with the pressure chambers C and D.

* * * * *

UNITED STATES PATENT AND TRADEMARK OFFICE
CERTIFICATE OF CORRECTION

PATENT NO. : 5,202,937

DATED : April 13, 1993

INVENTOR(S) : THOMAS ARVIDSSON

It is certified that error appears in the above-identified patent and that said Letters Patent is hereby corrected as shown below:

On the cover page, in the Abstract, line 12 of the Abstract, "of the" should be deleted.

Column 4:
In claim 1, line 6 of the claim, "(9)" should be deleted.

Signed and Sealed this

Twenty-ninth Day of March, 1994

*Attest:*

BRUCE LEHMAN

*Attesting Officer*   *Commissioner of Patents and Trademarks*